(12) United States Patent
Darak et al.

(10) Patent No.: US 11,095,683 B1
(45) Date of Patent: Aug. 17, 2021

(54) SYSTEMS AND METHODS FOR DELEGATING ENDPOINT SECURITY OPERATIONS TO A NEARBY COMPUTING DEVICE

(71) Applicant: Symantec Corporation, Mountain View, CA (US)

(72) Inventors: Anand Darak, Pune (IN); Sachin Patil, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 299 days.

(21) Appl. No.: 16/233,991

(22) Filed: Dec. 27, 2018

(51) Int. Cl.
*H04L 29/08* (2006.01)
*H04L 29/06* (2006.01)

(52) U.S. Cl.
CPC .................... *H04L 63/20* (2013.01)

(58) Field of Classification Search
None
See application file for complete search history.

(56) References Cited

U.S. PATENT DOCUMENTS

| | | | |
|---|---|---|---|
| 10,673,880 B1* | 6/2020 | Pratt | G06N 20/00 |
| 2017/0205816 A1* | 7/2017 | Onoue | G05B 23/0208 |
| 2018/0288094 A1* | 10/2018 | Ahuja | H04L 41/0893 |
| 2019/0346506 A1* | 11/2019 | Schamber | G01R 22/10 |

* cited by examiner

*Primary Examiner* — Cai Y Chen
(74) *Attorney, Agent, or Firm* — FisherBroyles, LLP

(57) ABSTRACT

The disclosed computer-implemented method for delegating endpoint security operations to a nearby computing device may include (i) receiving device state data from one or more computing devices, (ii) determining a device state reputation for each of the one or more computing devices based on the device state data, (iii) selecting a device from the one or more computing devices based on the device state reputation for each of the one or more computing devices, and (iv) in response to selecting the device, delegating one or more operations for a security action to the selected device. Various other methods, systems, and computer-readable media are also disclosed.

20 Claims, 6 Drawing Sheets

US 11,095,683 B1

SYSTEMS AND METHODS FOR DELEGATING ENDPOINT SECURITY OPERATIONS TO A NEARBY COMPUTING DEVICE

BACKGROUND

Computing devices have become increasingly ubiquitous due to their increasing computing capabilities and portability. However, continuous protection may be necessary to protect computing devices from malicious attack. Attackers may leverage any vulnerability on a computing device to cause damage to the device and act against the interest of the computer user, such as by stealing personal information or the like. Unfortunately, continuous protection of computing devices may require memory- and processor-intensive activities that may have a negative impact on the performance of the computing device. For instance, some protection activities may drain the battery of the device or slow down the performance of the device for other executing applications. This may result in users disabling the endpoint security software to improve performance of the computing device, which may leave the computing device vulnerable to malware or other malicious attacks. The instant disclosure, therefore, identifies and addresses a need for systems and methods for delegating endpoint security operations to a nearby computing device.

SUMMARY

As will be described in greater detail below, the instant disclosure describes various systems and methods for delegating endpoint security operations to a nearby computing device.

In one example, a method for delegating endpoint security operations to a nearby computing device may include (i) receiving device state data from one or more computing devices, (ii) determining a device state reputation for each of the one or more computing devices based on the device state data, (iii) selecting a device from the one or more computing devices based on the device state reputation for each of the one or more computing devices, and (iv) in response to selecting the device, delegating one or more operations for a security action to the selected device.

In some examples, the device state data may include at least one of (i) an interactive state of a respective computing device, (ii) an indication that a network of the respective computing device is metered or non-metered, (iii) a battery level of the respective computing device, (iv) CPU utilization of the respective computing device, (v) memory utilization of the respective computing device, or (vi) types of applications executing on the respective computing device. The operations for the security action may include at least one of (i) scanning available wireless networks, (ii) obtaining security reputation data associated with one or more applications, (iii) obtaining security reputation data associated with one or more websites, or (iv) obtaining one or more security policies from a server.

In some examples, the method may include (i) determining that the selected device has become unavailable after delegating the one or more operations for the security action to the selected device, (ii) selecting a different device from the one or more computing devices based on the device state reputation for each of the one or more computing devices, and (iii) in response to selecting the different device, re-delegating the one or more operations for the security action to the selected different device. In some examples, the method may include (i) receiving updated device state data for a different device of the one or more computing devices, (ii) determining a new device state reputation for the different device based on the updated device state data, (iii) comparing the new device state reputation to the device state reputation for each of the one or more computing devices, (iv) selecting the different device based on the new device state reputation, and (v) in response to selecting the device, delegating one or more operations for a different security action to the different device.

In some examples, the method may include the selected device (i) receiving one or more operations for security actions from the one or more computing devices, (ii) requesting data for the one or more operations for security actions from the one or more computing devices and the delegated one or more operations for the security action from the computing device, and (iii) transmitting a respective subset of the data to the computing device and the one or more computing devices. The method may include generating a report indicating performance metrics based on the delegated one or more operations for the security action and presenting the report to a user of the computing device.

In one embodiment, a system for delegating endpoint security operations to a nearby computing device may include at least one physical processor and physical memory that includes computer-executable instructions that, when executed by the physical processor, cause the physical processor to (i) receive device state data from one or more computing devices, (ii) determine a device state reputation for each of the one or more computing devices based on the device state data, (iii) select a device from the one or more computing devices based on the device state reputation for each of the one or more computing devices, and (iv) in response to selecting the device, delegate one or more operations for a security action to the selected device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive device state data from one or more computing devices, (ii) determine a device state reputation for each of the one or more computing devices based on the device state data, (iii) select a device from the one or more computing devices based on the device state reputation for each of the one or more computing devices, and (iv) in response to selecting the device, delegate one or more operations for a security action to the selected device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
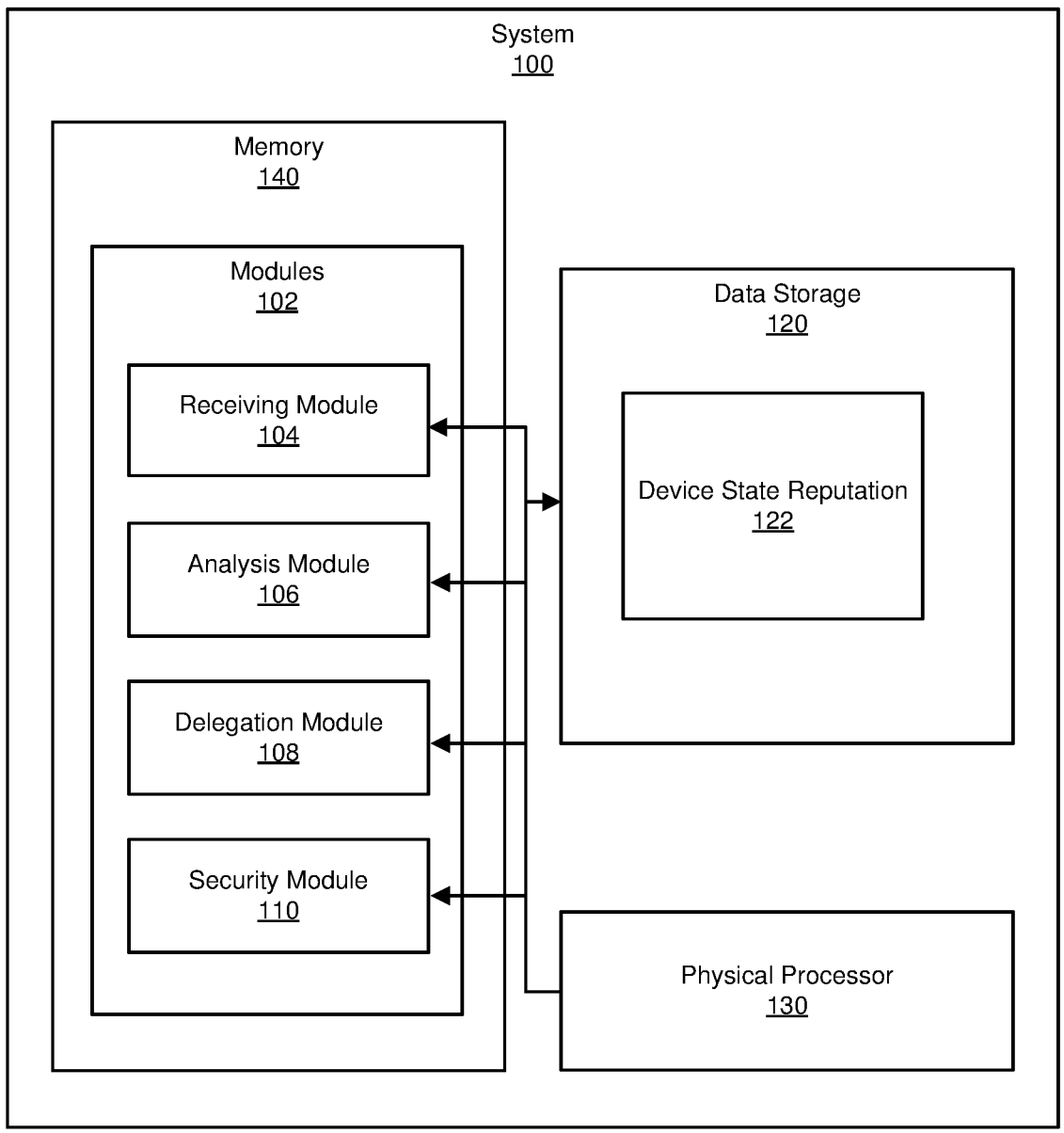
FIG. 1 is a block diagram of an example system for delegating endpoint security operations to a nearby computing device.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for delegating endpoint security operations to a nearby computing device. As will be described in greater detail below, the computing capability of nearby computing devices may be leveraged to provide continuous security protection without negatively impacting the performance of the computing device. For example, a smartphone utilized by a user may have a low battery level. Executing endpoint security operations may drain the remaining battery and the user may be deprived of a functioning smartphone until the smartphone can be charged. The systems and methods described herein may enable the smartphone to detect nearby computing devices, such a tablet, a smart television, a laptop, or other nearby computing device. The smartphone may be subscribed to the nearby computing devices and may receive data published by each of the computing devices. The data may include information indicative of the state of the respective device. For instance, the tablet may be fully charged and currently idle, the smart television may be streaming a movie and plugged into a power source, and the laptop may be partially charged and currently used for online shopping. The methods and systems described herein may use the data received from each of the devices and generate a device state reputation. The device state reputation may indicate the current state of the device and computing capabilities available to execute operations. The smartphone may select one of the nearby devices based on their respective device state reputation. For example, the smartphone may select the tablet because the device state reputation may indicate that the tablet is fully charged, currently idle, and connected to a wireless network. Upon selecting the tablet, the smartphone may delegate operations of a security action to the tablet, such as obtaining security reputation data for website to be viewed on the smartphone. The tablet may execute the delegated operation from the smartphone and retrieve security reputation data for the website. The tablet may then transmit the security reputation data to the smartphone, which may use the received security reputation data to complete the security action of determining whether the website is malicious and providing a recommendation to the user of the smartphone. The smartphone is able to perform the security action of determining whether the website is malicious using the results of the operations executed by the tablet.

Thus, by leveraging the computing capabilities of a nearby computing device (e.g., the tablet), the smartphone may have continuous security protection without interference to usage of the smartphone by the user.

Figure 2:
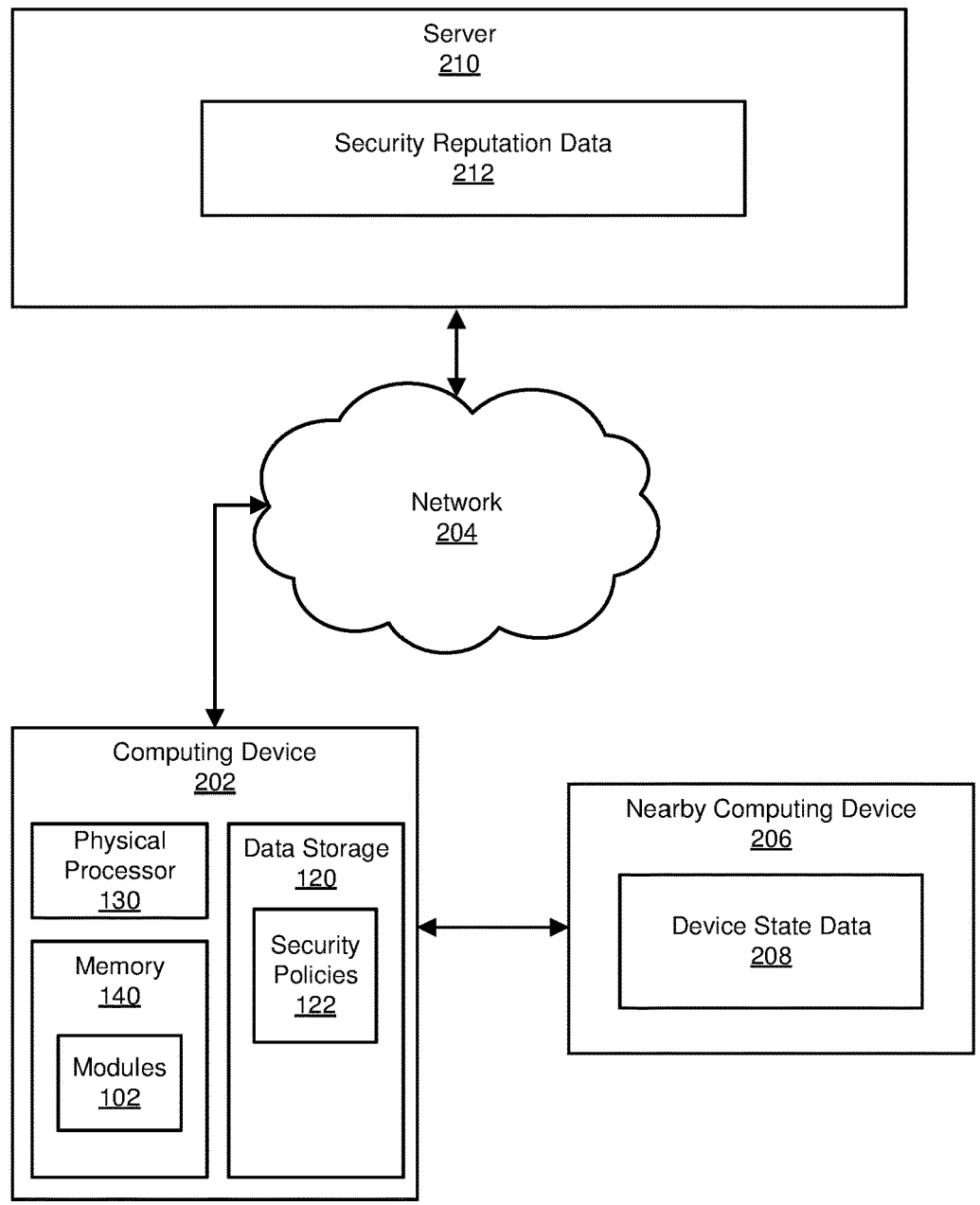
FIG. 2 is a block diagram of an additional example system for delegating endpoint security operations to a nearby computing device.

The following will provide, with reference to FIGS. 1-2, detailed descriptions of example systems for delegating endpoint security operations to a nearby computing device. Detailed descriptions of corresponding computer-implemented methods will also be provided in connection with FIG. 3. A detailed description of data flow through the example system for delegating endpoint security operations to a nearby computing device will also be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for delegating endpoint security operations to a nearby computing device. As illustrated in this figure, the example system 100 may include one or more modules 102 for performing one or more tasks. As will be explained in greater detail below, the modules 102 may include a receiving module 104, an analysis module 106, a delegation module 108, and a security module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., a computing device 202, a nearby computing device 206, and/or a server 210). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate delegating endpoint security operations to a nearby computing device. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store device state reputation 122. As described herein, the device state reputation 122 of nearby computing devices may be determined and stored in the data storage 120. The device state reputation 122 for nearby computing devices may be stored until delegated operations have been completed and/or the device state reputation 122 of a computing device are recalculated and replace the previous device state reputation 122 stored in the data storage 120.

The example system 100 in FIG. 1 may be implemented in a variety of ways. For example, all or a portion of the example system 100 may represent portions of example system 200 in FIG. 2. As shown in FIG. 2, the system 200 may include a computing device 202 in communication with a nearby computing device 206 and/or a server 210 via a network 204. In some examples, the system 200 may include the computing device 202 in communication with the server 210 via network 204 and the computing device 202 and the nearby computing device 206 may be in communication through a peer-to-peer protocol, such as the Nearby protocol by Google. In one example, all or a portion of the functionality of the modules 102 may be performed by the computing device 202, the nearby computing device 206, the server 210, and/or any other suitable computing system. As will be described in greater detail below, one or more of the modules 102 from FIG. 1 may, when executed by at least one processor of the computing device 202, the nearby computing device 206, and/or the server 210, enable the computing device 202, the nearby computing device 206, and/or the server 210 to delegate endpoint security operations to a nearby computing device For example, and as will be described in greater detail below, one or more of the modules 102 may cause the computing device 202, the nearby computing device 206, and/or the server 210 to receive device state data from one or more computing devices, determine a device state reputation for each of the one or more computing devices based on the device state data, select a device from the one or more computing devices based on the device state reputation for each of the one or more computing devices, and in response to selecting the device, delegate one or more operations for a security action to the selected device.

The computing device 202 generally represents any type or form of computing device capable of reading computer-executable instructions. For example, the computing device 202 may include an endpoint device (e.g., a mobile computing device) running client-side security software capable of delegating security operations to a nearby computing device, such as nearby computing device 206. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The nearby computing device 206 generally represents any type or form of computing device capable of reading computer-executable instructions. For example, the nearby computing device 206 may include an endpoint device (e.g., a mobile computing device) running client-side security software capable of receiving and processing delegated tasks from a computing device, such as the computing device 202. Both the computing device 202 and the nearby computing device 206 may publish notifications that contain device state data 208. Examples of device state data 208 may include, but are not limited to, an interactive state of a respective computing device, an indication that a network of the respective computing device is metered or non-metered, a battery level of the respective computing device, CPU utilization of the respective computing device, memory utilization of the respective computing device, or types of applications executing on the respective computing device.

Additional examples of the nearby computing device 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The server 210 generally represents any type or form of computing device that is capable of reading computer-executable instructions. In one example, the server 210 may represent a server capable of managing security reputation data 212 for security software, such as client-side security software. Additional examples of the server 210 include, without limitation, security servers, application servers, web servers, storage servers, and/or database servers configured to run certain software applications and/or provide various security, web, storage, and/or database services. Although illustrated as a single entity in FIG. 2, the server 210 may include and/or represent a plurality of servers that work and/or operate in conjunction with one another.

The network 204 generally represents any medium or architecture capable of facilitating communication or data transfer. In one example, the network 204 may facilitate communication between the computing device 202, the nearby computing device 206, and/or the server 210. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
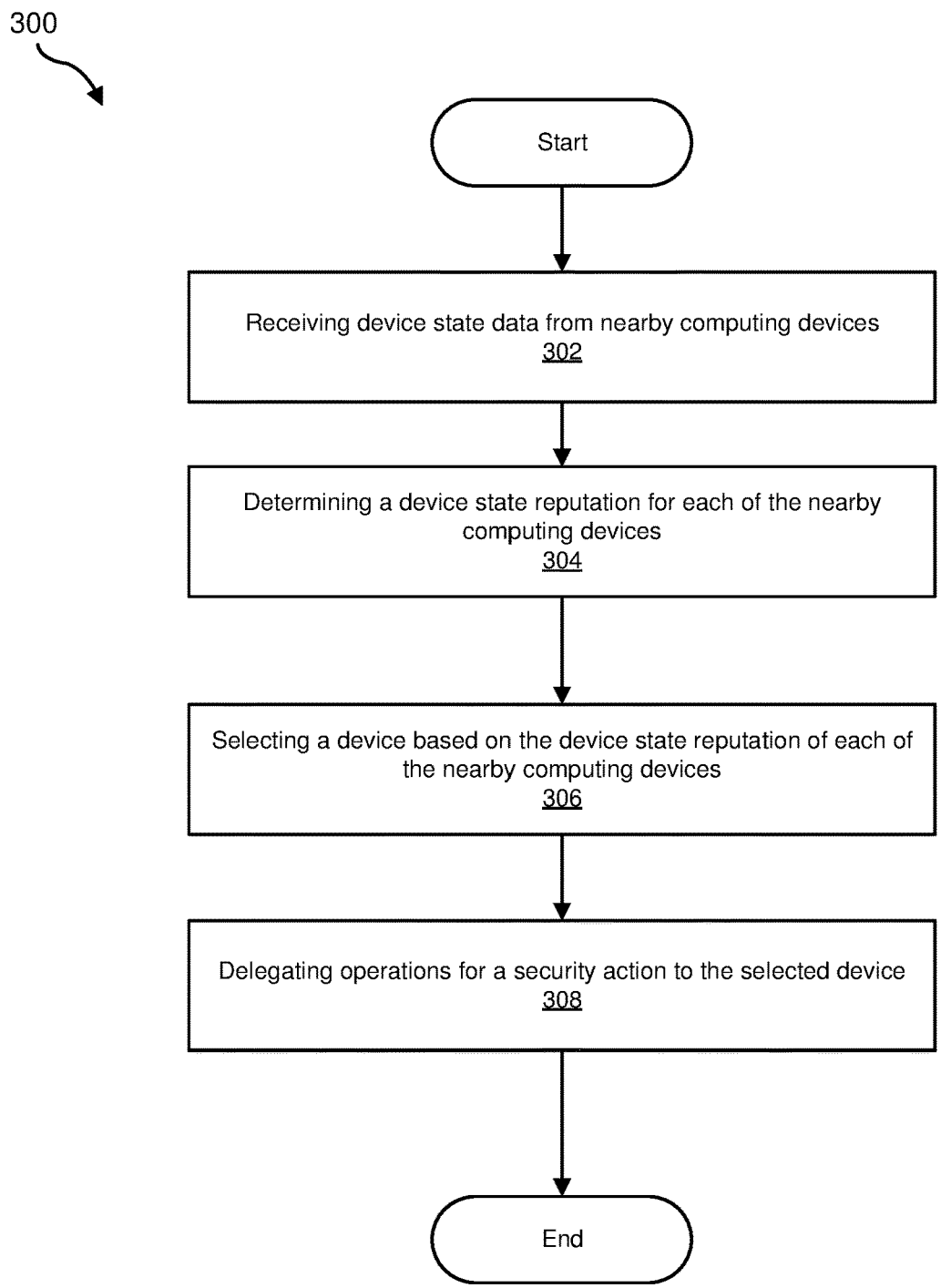
FIG. 3 is a flow diagram of an example method for delegating endpoint security operations to a nearby computing device.
Figure 4:
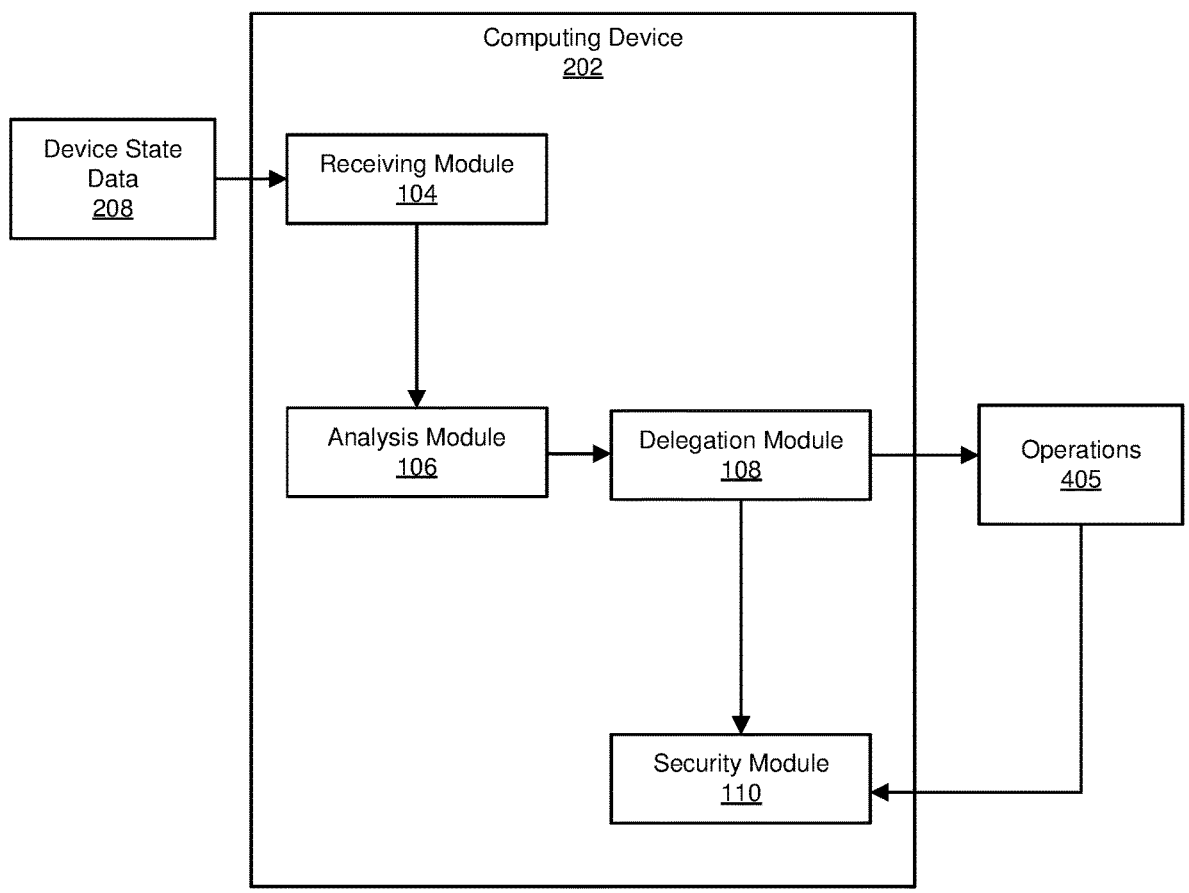
FIG. 4 is a data flow diagram of an example system for delegating endpoint security operations to a nearby computing device.

FIG. 3 is a flow diagram of an example computer-implemented method 300 for delegating endpoint security operations to a nearby computing device. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive device state data, such as the device state data 208, from nearby computing devices, such as the nearby computing device 206. The system may receive device state data 208 from nearby computing devices in any suitable manner. For example, the receiving module 104 may, as part of the computing device 202 in FIG. 2, receive device state data 208 from one or more nearby computing devices, such as the nearby computing device 206. The computing device 202 may discover and establish direct communication channels with other devices without having to be connected to the Internet, such as by using application program interfaces (APIs) for proximity and cross device communication (e.g., Nearby™ by Google™). The computing device 202 may use such technologies as Bluetooth, Wi-Fi, IP, or audio, to discover the nearby computing device 206. In some examples, the computing device 202 may compare the list of Wi-Fi access points available to each device. If the list is similar or both devices (e.g., the computing device 202 and the nearby computing device 206) are connected to the same access point, a direct connection may be established.

In some examples, the computing device 202 may transmit a special token that can be seen by nearby devices. Direct connections may be established upon receiving and acknowledging the token. In some examples, the computing device 202 may emit an ultrasonic sound that may be detected by the microphone of nearby computing devices. If two devices can receive and acknowledge the sound, a direct connection between the devices may be established.

Once the direct connection is established between the computing device 202 and the nearby computing device 206, data may be transmitted between the devices. For example, each device may publish device state data in broadcast messages. Subscribed devices may receive the published messages containing the device state data 208.

The term "device state data," as used herein, generally refers to data indicative of a status or state of one or more components of a computing device. Device state data may include an interactive state of a respective computing device. The interactive state of a computing device may be indicative of a current activity level of the computing device, such as an indication that the device is idle or if the device is currently being utilized. Device state data may include an indication that a network of the respective computing device is metered or non-metered (e.g., networks that charge by the amount of data used by the device). For example, the indication may specify that a device is using a non-metered network if the device is connected to a wireless network, whereas if the device is connected to a cellular network, the indication may specify a metered network.

In some examples, the device state data may indicate a status of a component of the computing device, such as a battery level, CPU utilization of the device, memory utilization of the device, whether the device is connected to a power source, or the like. Additionally, the device state data may indicate a number of applications and the types of applications executing on the respective computing device, such as an email application, content streaming application, gaming application, or the like.

At step 304, one or more of the systems described herein may determine a device state reputation for each of the nearby computing devices. The system may determine the device state reputation for each of the nearby computing devices in any suitable manner. For example, the analysis module 106 may use the device state data 208 received from the nearby computing device 206 to determine or calculate a device state reputation 122.

The term "device state reputation," as used herein, generally refers to a value indicative of a device state of a computing device. Device state reputation may be calculated using device state data received from a computing device. For example, the computing device 202 may calculate the device state reputation 122 for the nearby computing device 206 using one or more known algorithms or techniques that that may apply a different weight to the different components of the device state data 208 received from the nearby computing device 206 and generate a value. For example, factors such as battery level or type of network of the computing device may be more highly weighted than types of applications executing on the respective computing device, and thus may be given a higher weight. The values may then be used to calculate a device state reputation 122.

In some examples, the analysis module 106 of the computing device 202 may use the device state data 208 received from the nearby computing device 206 to determine or generate the device state reputation. The analysis module 106 may obtain a numeric value for each of the different device state data 208 (e.g., a numeric value indicative of the interactive state of the nearby computing device 206, a numeric value indicative of the type of network used by the nearby computing device 206, etc.). The analysis module 106 may use one or more known scoring algorithms to generate the device state reputation. In some examples, prior to submitting the values of the device state data 208 to the scoring algorithm, the analysis module 106 may adjust the values of the device state data 208 based on different factors, such as user preference (e.g., preference for devices connected to unmetered networks), type of operation to be delegated (e.g., processor-intensive scanning of networks, retrieval of security reputation data 212, etc.), the device type of the nearby computing device 206 (e.g., stationary television, mobile tablet, etc.), or the like. The adjusted values may be submitted to the scoring algorithm to generate the device state reputation for the respective computing devices (e.g., the nearby computing device 206).

At step 306, one or more of the systems described herein may select a device based on the device state reputation of each of the nearby computing devices. The system may select the device based on the device state reputation in any suitable manner. In some examples, the analysis module 106 of the computing device 202 may analyze the device state reputation 122 for each of the nearby computing devices and select a device based on the device state reputation 122. For example, the analysis module 106 may select a device that has the highest value for its device state reputation 122.

In some examples, the analysis module 106 may select a device from the nearby computing devices using the device state reputation of each device and additional factors. For example, a user may indicate a preference to weight certain device state device more heavily than others, such as ranking the use of a non-metered network by a computing device over an interactive state of the computing device. Other examples may include network latency between the computing device 202 and the nearby computing device 206, type of operation to be delegated to the selected nearby computing device 206, estimated time for the execution of the delegated operation and whether the nearby computing device 206 is connected to a power source (e.g., if the operation is estimated to take over an hour, the analysis module 106 may select a nearby computing device 206 that is connected to a power source to ensure the selected device does not lose power during the execution of the delegated operation), and the like.

At step 308, one or more of the systems described herein may delegate operations for a security action to the selected device. The system may delegate operations for the security action to the selected device in any suitable manner. In some examples, the delegation module 108 may receive, from the analysis module 106, data identifying the selected nearby computing device 206. In response to receiving the data, the delegation module 108 may delegate one or more operations of a security action to the selected nearby computing device 206. Examples of operations that may be delegated may include scanning available wireless networks, obtaining security reputation data 212 associated with one or more applications, obtaining security reputation data 212 associated with one or more websites, obtaining one or more security policies from a server, or the like.

In some examples, multiple computing devices in close proximity to each other may each independently determine or select the same device to delegate operations. Accordingly, the selected device may receive delegated tasks from multiple nearby computing devices. Some operations may require the selected nearby computing device 206 to communicate with the server 210 to obtain information, such as security reputation data 212. Rather than sending multiple requests to the server 210, the selected nearby computing device 206 may use a combined query mechanism to obtain data from the server 210. For instance, the nearby computing device 206 may transmit a single request that contains all the requests from the different computing devices. By transmitting a single request rather than separate requests for each device, the nearby computing device 206 may decrease the network traffic to the server 210, increasing the overall network bandwidth. Upon receiving the response from the server 210 containing the security reputation data 212, the selected nearby computing device 206 may parse the response to identify a respective subset of the data corresponding to the respective requesting computing devices. The selected nearby computing device 206 may transmit the respective subset of the data to the corresponding respective requesting computing device, such as the computing device 202.

In some examples, the selected nearby computing device 206 may become unavailable after delegation of the operations for the security action. The computing device 202 may determine that the nearby computing device 206 is no longer available by transmitting a status request to the nearby computing device 206 and not receiving a response within a predetermined window of time. Upon determining that the selected nearby computing device 206 has become unavailable after delegating the one or more operations, the analysis module 106 may select a different device from the one or more computing devices based on the device state reputation 122 for each of the one or more computing devices. In some examples, the analysis module 106 may evaluate the previously determined device state reputation 122 of the nearby computing devices. In some examples, the analysis module 106 may recalculate the device state reputation 122 of the nearby computing devices. In response to selecting a different device, the delegation module 108 may re-delegate the operations for the security action to the newly selected device.

In some examples, the receiving module 104 may receive updated device state data 208 for one or more of the nearby computing devices. The analysis module 106 may determine a new device state reputation 122 for the device based on the updated device state data 208. The analysis module 106 may compare the new device state reputation 122 of the device to the device state reputation 122 for each of the nearby computing devices. The analysis module 106 may select a different device than the previously selected nearby computing device 206 based on the new device state reputation 122 (e.g., the new device state reputation may be higher than that of the previously selected nearby computing device 206). In response to selecting the newly selected device, the delegation module 108 may delegate one or more operations for a different security action to the newly selected device.

At step 310, one or more of the systems described herein may perform the security action based on the completed operations from the selected device. The system may perform the security action in any suitable manner. In some examples, the security module 110 may receive, from the nearby computing device 206, the results of the completed delegated operations. For example, if the delegate operation was to obtain security reputation data 212 from the server 210, the security module 110 may receive the security reputation data 212 and use the security reputation data 212 to perform the security action. Examples of security actions may include identifying potential malware, generating reports, providing recommendations for actions to remedy identified vulnerabilities, and the like.

In some examples, the security module 110 may generate a report indicating performance metrics based on the delegated one or more operations for the security action and present the report to a user of the computing device 202. For example, the report may include performance savings for the battery consumption, memory and processor utilization, or the like of the computing device 202 as a result of delegating the operations to the nearby computing device 206.

The example system 100 in FIG. 1 may be implemented in a variety of ways. For example, all or a portion of the example system 100 may represent portions of the system 400 in FIG. 4. As will be described in greater detail below, one or more of the modules 102 from FIG. 1 may, when executed by at least one processor of computing device 202, enable the system 400 to delegate security operations to a nearby computing device, such as nearby computing device 206. For example, and as will be described in greater detail below, one or more of the modules 102 may cause the example system 400 to receive, by receiving module 104 of the computing device 202, device state data 208 from one or more nearby computing devices, such as the nearby computing device 206. The analysis module 106 may determine a device state reputation 122 for each of the one or more nearby computing devices based on the received device state data 208. The analysis module 106 may select a device from the one or more nearby computing devices based on the device state reputation 122 for each of the one or more nearby computing devices. The delegation module 108 may, in response to selecting the device, delegate one or more operations 405 for a security action to the selected device. The security module 110 may receive the results of the completed operations 405 and may manage the completion of the security actions for the computing device 202 based on the completed operations 405.

The systems and methods described herein are generally directed to delegating endpoint security operations to a nearby computing device. Existing endpoint security solutions may require memory and process intensive mechanisms for continuous security protection. However, such mechanisms may have a negative impact on the operation of a computing device, such as negatively impacting performance of a smartphone or tablet during use by a user. The systems and methods described herein are directed to leveraging the computing capability of nearby devices to ensure continuous security protection while enabling a computing device to perform without hindrance. A computing device may receive device state data from nearby computing devices and calculate a device state reputation for each nearby device. The device state reputation may be based on device state data received from each of the devices and may indicate the availability and computing capability available to perform security operations for a security. The computing device may select a device from the nearby devices based on the device state reputation of the device and may delegate one or more security operations. The selected device may complete the security operations and return the results to the computing device. The computing device may then use the receive results of the completed operations to complete the security action. By leveraging the computing capabilities of nearby computing devices, a computing device may have continuous security protection without interference to usage by a user of the computing device.

Figure 5:
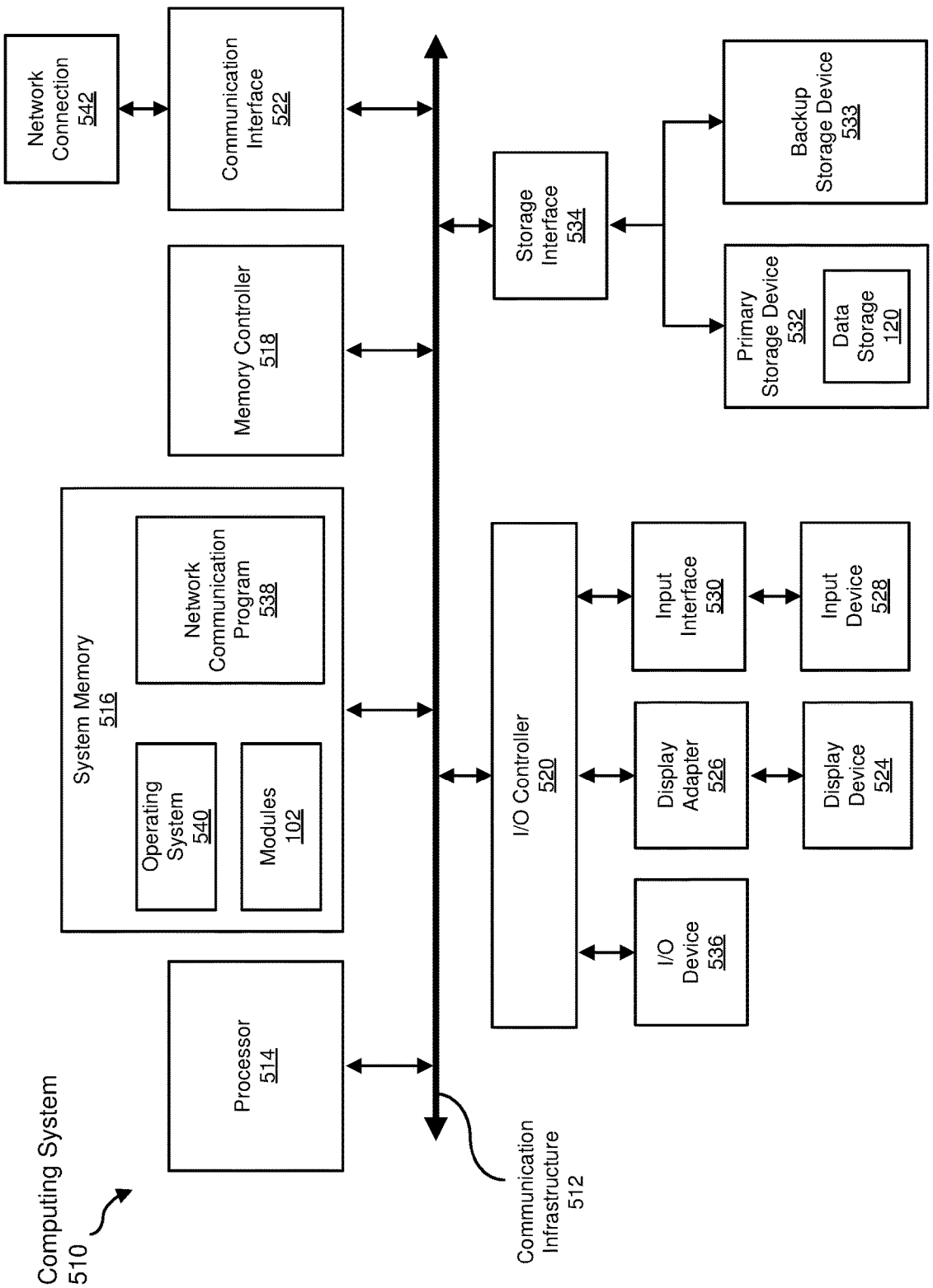
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of the computing system 510 may perform and/or be a means for performing, either alone or in combination with other elements, one or more of the steps described herein (such as one or more of the steps illustrated in FIGS. 3-4). All or a portion of the computing system 510 may also perform and/or be a means for performing any other steps, methods, or processes described and/or illustrated herein.

The computing system 510 broadly represents any single or multi-processor computing device or system capable of executing computer-readable instructions. Examples of the computing system 510 include, without limitation, workstations, laptops, client-side terminals, servers, distributed computing systems, handheld devices, or any other computing system or device. In its most basic configuration, the computing system 510 may include at least one processor 514 and a system memory 516.

The processor 514 generally represents any type or form of physical processing unit (e.g., a hardware-implemented central processing unit) capable of processing data or interpreting and executing instructions. In certain embodiments, the processor 514 may receive instructions from a software application or module. These instructions may cause the processor 514 to perform the functions of one or more of the example embodiments described and/or illustrated herein.

The system memory 516 generally represents any type or form of volatile or non-volatile storage device or medium capable of storing data and/or other computer-readable instructions. Examples of the system memory 516 include, without limitation, Random Access Memory (RAM), Read Only Memory (ROM), flash memory, or any other suitable memory device. Although not required, in certain embodiments, the computing system 510 may include both a volatile memory unit (such as, for example, system memory 516) and a non-volatile storage device (such as, for example, primary storage device 532, as described in detail below). In one example, one or more of the modules 102 from FIG. 1 may be loaded into the system memory 516.

In some examples, the system memory 516 may store and/or load an operating system 540 for execution by the processor 514. In one example, the operating system 540 may include and/or represent software that manages computer hardware and software resources and/or provides common services to computer programs and/or applications on the computing system 510. Examples of the operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 510 may also include one or more components or elements in addition to the processor 514 and the system memory 516. For example, as illustrated in FIG. 5, the computing system 510 may include a memory controller 518, an Input/Output (I/O) controller 520, and a communication interface 522, each of which may be interconnected via a communication infrastructure 512. The communication infrastructure 512 generally represents any type or form of infrastructure capable of facilitating communication between one or more components of a computing device. Examples of the communication infrastructure 512 include, without limitation, a communication bus (such as an Industry Standard Architecture (ISA), Peripheral Component Interconnect (PCI), PCI Express (PCIe), or similar bus) and a network.

The memory controller 518 generally represents any type or form of device capable of handling memory or data or controlling communication between one or more components of the computing system 510. For example, in certain embodiments, the memory controller 518 may control communication between the processor 514, the system memory 516, and the I/O controller 520 via the communication infrastructure 512.

The I/O controller 520 generally represents any type or form of module capable of coordinating and/or controlling the input and output functions of a computing device. For example, in certain embodiments, the I/O controller 520 may control or facilitate transfer of data between one or more elements of the computing system 510, such as the processor 514, the system memory 516, the communication interface 522, the display adapter 526, the input interface 530, and the storage interface 534.

As illustrated in FIG. 5, the computing system 510 may also include at least one display device 524 coupled to the I/O controller 520 via a display adapter 526. The display device 524 generally represents any type or form of device capable of visually displaying information forwarded by the display adapter 526. Similarly, the display adapter 526 generally represents any type or form of device configured to forward graphics, text, and other data from the communication infrastructure 512 (or from a frame buffer, as known in the art) for display on the display device 524.

As illustrated in FIG. 5, the example computing system 510 may also include at least one input device 528 coupled to the I/O controller 520 via an input interface 530. The input device 528 generally represents any type or form of input device capable of providing input, either computer or human generated, to example computing system 510. Examples of the input device 528 include, without limitation, a keyboard, a pointing device, a speech recognition device, variations or combinations of one or more of the same, and/or any other input device.

Additionally or alternatively, the example computing system 510 may include additional I/O devices. For example, the example computing system 510 may include the I/O device 536. In this example, the I/O device 536 may include and/or represent a user interface that facilitates human interaction with the computing system 510. Examples of the I/O device 536 include, without limitation, a computer mouse, a keyboard, a monitor, a printer, a modem, a camera, a scanner, a microphone, a touchscreen device, variations or combinations of one or more of the same, and/or any other I/O device.

The communication interface 522 broadly represents any type or form of communication device or adapter capable of facilitating communication between the example computing system 510 and one or more additional devices. For example, in certain embodiments, the communication interface 522 may facilitate communication between the computing system 510 and a private or public network including additional computing systems. Examples of the communication interface 522 include, without limitation, a wired network interface (such as a network interface card), a wireless network interface (such as a wireless network interface card), a modem, and any other suitable interface. In at least one embodiment, the communication interface 522 may provide a direct connection to a remote server via a direct link to a network, such as the Internet. The communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 522 may also represent a host adapter configured to facilitate communication between the computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 522 may also allow the computing system 510 to engage in distributed or remote computing. For example, the communication interface 522 may receive instructions from a remote device or send instructions to a remote device for execution.

In some examples, the system memory 516 may store and/or load a network communication program 538 for execution by the processor 514. In one example, the network communication program 538 may include and/or represent software that enables the computing system 510 to establish a network connection 542 with another computing system (not illustrated in FIG. 5) and/or communicate with the other computing system by way of the communication interface 522. In this example, the network communication program 538 may direct the flow of outgoing traffic that is sent to the other computing system via the network connection 542. Additionally, or alternatively, the network communication program 538 may direct the processing of incoming traffic that is received from the other computing system via the network connection 542 in connection with the processor 514.

Although not illustrated in this way in FIG. 5, the network communication program 538 may alternatively be stored and/or loaded in the communication interface 522. For example, the network communication program 538 may include and/or represent at least a portion of software and/or firmware that is executed by a processor and/or Application Specific Integrated Circuit (ASIC) incorporated in the communication interface 522.

As illustrated in FIG. 5, the example computing system 510 may also include a primary storage device 532 and a backup storage device 533 coupled to the communication infrastructure 512 via a storage interface 534. The storage devices 532 and 533 generally represent any type or form of storage device or medium capable of storing data and/or other computer-readable instructions. For example, the storage devices 532 and 533 may be a magnetic disk drive (e.g., a so-called hard drive), a solid state drive, a floppy disk drive, a magnetic tape drive, an optical disk drive, a flash drive, or the like. The storage interface 534 generally represents any type or form of interface or device for transferring data between the storage devices 532 and 533 and other components of the computing system 510. In one example, the data storage 120 from FIG. 1 may be stored and/or loaded in the primary storage device 532.

In certain embodiments, the storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 532 and 533 may also include other similar structures or devices for allowing computer software, data, or other computer-readable instructions to be loaded into the computing system 510. For example, the storage devices 532 and 533 may be configured to read and write software, data, or other computer-readable information. The storage devices 532 and 533 may also be a part of the computing system 510 or may be a separate device accessed through other interface systems.

Many other devices or subsystems may be connected to the computing system 510. Conversely, all of the components and devices illustrated in FIG. 5 need not be present to practice the embodiments described and/or illustrated herein. The devices and subsystems referenced above may also be interconnected in different ways from that shown in FIG. 5. The computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 510. All or a portion of the computer program stored on the computer-readable medium may then be stored in the system memory 516 and/or various portions of the storage devices 532 and 533. When executed by the processor 514, a computer program loaded into the computing system 510 may cause the processor 514 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 510 may be configured as an Application Specific Integrated Circuit (ASIC) adapted to implement one or more of the example embodiments disclosed herein.

Figure 6:
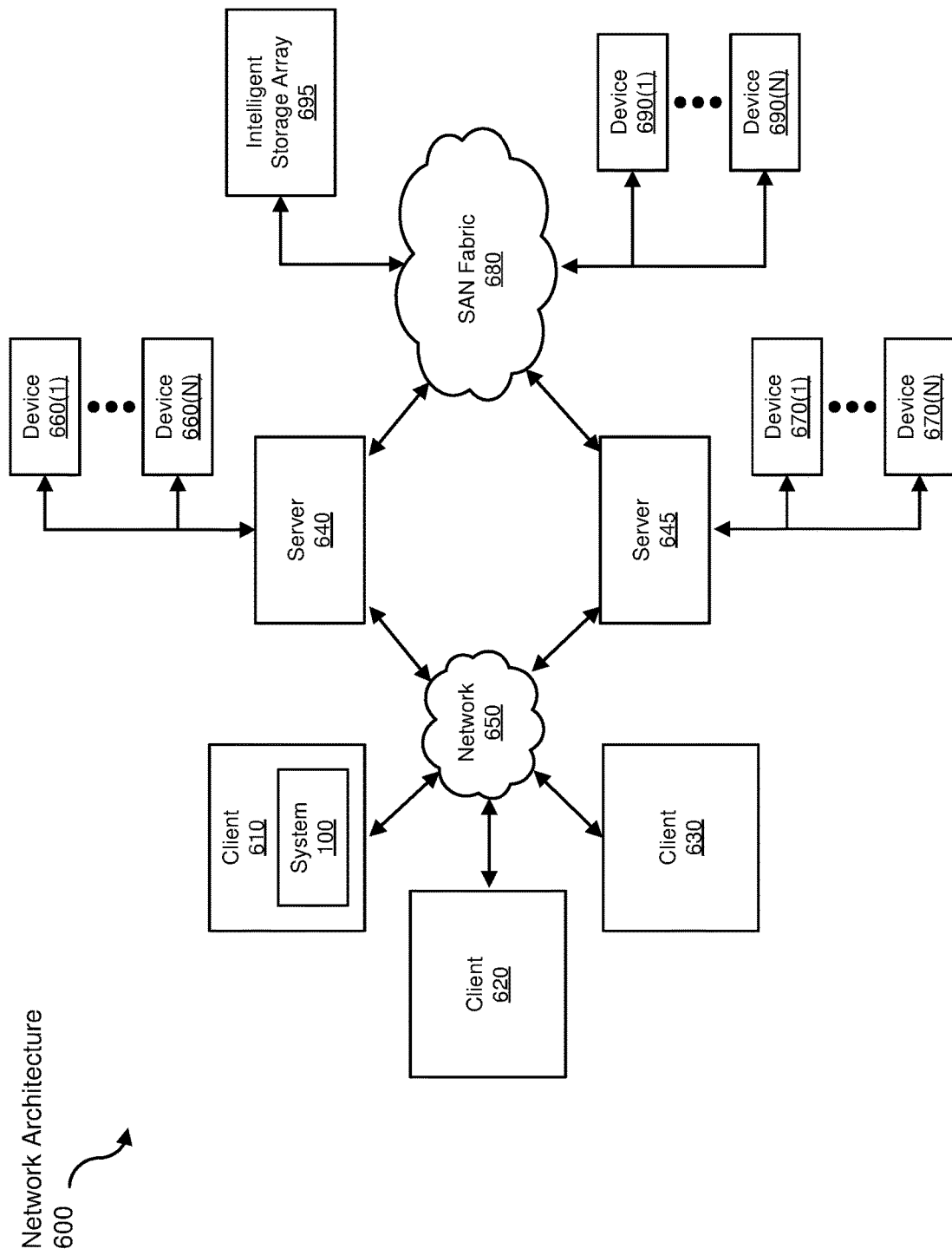
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of the network architecture 600 may perform and/or be a means for performing, either alone or in combination with other elements, one or more of the steps disclosed herein (such as one or more of the steps illustrated in FIG. 3). All or a portion of the network architecture 600 may also be used to perform and/or be a means for performing other steps and features set forth in the instant disclosure.

The client systems 610, 620, and 630 generally represent any type or form of computing device or system, such as example the computing system 510 in FIG. 5. Similarly, the servers 640 and 645 generally represent computing devices or systems, such as application servers or database servers, configured to provide various database services and/or run certain software applications. The network 650 generally represents any telecommunication or computer network including, for example, an intranet, a WAN, a LAN, a PAN, or the Internet. In one example, the client systems 610, 620, and/or 630 and/or the servers 640 and/or 645 may include all or a portion of the system 100 from FIG. 1.

As illustrated in FIG. 6, one or more storage devices 660(1)-(N) may be directly attached to the server 640. Similarly, the one or more storage devices 670(1)-(N) may be directly attached to the server 645. The storage devices 660(1)-(N) and the storage devices 670(1)-(N) generally represent any type or form of storage device or medium capable of storing data and/or other computer-readable instructions. In certain embodiments, the storage devices 660(1)-(N) and the storage devices 670(1)-(N) may represent Network-Attached Storage (NAS) devices configured to communicate with the servers 640 and 645 using various protocols, such as Network File System (NFS), Server Message Block (SMB), or Common Internet File System (CIFS).

The servers 640 and 645 may also be connected to a Storage Area Network (SAN) fabric 680. The SAN fabric 680 generally represents any type or form of computer network or architecture capable of facilitating communication between a plurality of storage devices. The SAN fabric 680 may facilitate communication between the servers 640 and 645 and a plurality of the storage devices 690(1)-(N) and/or an intelligent storage array 695. The SAN fabric 680 may also facilitate, via the network 650 and the servers 640 and 645, communication between the client systems 610, 620, and 630 and the storage devices 690(1)-(N) and/or the intelligent storage array 695 in such a manner that the devices 690(1)-(N) and they array 695 appear as locally attached devices to the client systems 610, 620, and 630. As with the storage devices 660(1)-(N) and the storage devices 670(1)-(N), the storage devices 690(1)-(N) and the intelligent storage array 695 generally represent any type or form of storage device or medium capable of storing data and/or other computer-readable instructions.

In certain embodiments, and with reference to the example computing system 510 of FIG. 5, a communication interface, such as communication interface 522 in FIG. 5, may be used to provide connectivity between each client system 610, 620, and 630 and the network 650. The client systems 610, 620, and 630 may be able to access information on the server 640 or 645 using, for example, a web browser or other client software. Such software may allow the client systems 610, 620, and 630 to access data hosted by the server 640, the server 645, the storage devices 660(1)-(N), the storage devices 670(1)-(N), the storage devices 690(1)-(N), or the intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by the server 640, the server 645, the storage devices 660(1)-(N), the storage devices 670(1)-(N), the storage devices 690(1)-(N), the intelligent storage array 695, or any combination thereof. All or a portion of one or more of the example embodiments disclosed herein may also be encoded as a computer program, stored in the server 640, run by the server 645, and distributed to the client systems 610, 620, and 630 over the network 650.

As detailed above, the computing system 510 and/or one or more components of the network architecture 600 may perform and/or be a means for performing, either alone or in combination with other elements, one or more steps of an example method for delegating endpoint security operations to a nearby computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for delegating a security operations for a first computing device to a different computing device, at least a portion of the method being performed by the first computing device, wherein the first computing device comprises at least one processor, the method comprising:
receiving, by the first computing device, device state data from one or more other computing devices;

determining a device state reputation for each of the one or more other computing devices based on the device state data;

selecting a device from the one or more other computing devices based on the device state reputation for each of the one or more other computing devices;

in response to selecting the device, delegating the security operation for the first computing device to the selected device; and receiving by the first computing device, a result of the delegated security operation from the selected device.

2. The computer-implemented method of claim 1, wherein the device state data comprises at least one of:
   (i) an interactive state of a respective computing device,
   (ii) an indication that a network of the respective computing device is metered or non-metered,
   (iii) a battery level of the respective computing device,
   (iv) CPU utilization of the respective computing device,
   (v) memory utilization of the respective computing device, or
   (vi) types of applications executing on the respective computing device.

3. The computer-implemented method of claim 1, wherein the security operation comprises at least one of:
   (i) scanning available wireless networks,
   (ii) obtaining security reputation data associated with one or more applications,
   (iii) obtaining security reputation data associated with one or more websites, or
   (iv) obtaining one or more security policies from a server.

4. The computer-implemented method of claim 1, further comprising:
   determining that the selected device has become unavailable after delegating the security operation to the selected device;
   selecting a different device from the one or more other computing devices based on the device state reputation for each of the one or more other computing devices; and
   in response to selecting the different device, re-delegating the security operation to the selected different device.

5. The computer-implemented method of claim 1, further comprising:
   receiving updated device state data for a different device of the one or more other computing devices;
   determining a new device state reputation for the different device based on the updated device state data;
   comparing the new device state reputation to the device state reputation for each of the one or more other computing devices;
   selecting the different device based on the new device state reputation; and
   in response to selecting the device, delegating a different security operation to the different device.

6. The computer-implemented method of claim 1, further comprising:
   receiving, by the selected device, one or more security operations from the one or more other computing devices;
   requesting, by the selected device, data for tone or more security operations from the one or more other computing devices and data for the delegated security operation from the first computing device; and
   transmitting, by the selected device, a respective subset of the requested data to the first computing device and to the one or more other computing devices.

7. The computer-implemented method of claim 1, further comprising:
   generating a report indicating performance metrics based on the delegated security operation; and
   presenting the report to a user of the first computing device.

8. A system for delegating a security operation for a first computing device to a different computing device, the system comprising:
   at least one physical processor;
   physical memory comprising computer-executable instructions that, when executed by the physical processor, cause the system to:
      receive device state data from one or more other computing devices;
      determine a device state reputation for each of the one or more other computing devices based on the device state data;
      select a device from the one or more other computing devices based on the device state reputation for each of the one or more other computing devices;
      in response to selecting the device, delegate the security operation for the first computing device to the selected device; and
      receive a result of the delegated security operation from the selected device.

9. The system of claim 8, wherein the device state data comprises at least one of:
   (i) an interactive state of a respective computing device,
   (ii) an indication that a network of the respective computing device is metered or non-metered,
   (iii) a battery level of the respective computing device,
   (iv) CPU utilization of the respective computing device,
   (v) memory utilization of the respective computing device, or
   (vi) types of applications executing on the respective computing device.

10. The system of claim 8, wherein the security operation comprises at least one of:
    (i) scanning available wireless networks,
    (ii) obtaining security reputation data associated with one or more applications,
    (iii) obtaining security reputation data associated with one or more websites, or
    (iv) obtaining one or more security policies from a server.

11. The system of claim 8, wherein the computer-executable instructions further cause the physical processor to:
    determine that the selected device has become unavailable after delegating the security operation to the selected device;
    select a different device from the one or more other computing devices based on the device state reputation for each of the one or more other computing devices; and
    in response to selecting the different device, re-delegate the security operation to the selected different device.

12. The system of claim 8, wherein the computer-executable instructions further cause the physical processor to:
    receive updated device state data for a different device of the one or more other computing devices;
    determine a new device state reputation for the different device based on the updated device state data;
    compare the new device state reputation to the device state reputation for each of the one or more other computing devices;
    select the different device based on the new device state reputation; and in response to selecting the device, delegate a different security operation to the different device.

13. The system of claim 8, wherein the computer-executable instructions further cause the physical processor to:
   receive, by the selected device, one or more security operations from the one or more other computing devices;
   request, by the selected device, data for the one or more security operations from the one or more other computing devices and data for the delegated security operation from the first computing device; and
   transmit, by the selected device, a respective subset of the requested data to the first computing device and to the one or more other computing devices.

14. The system of claim 8, wherein the computer-executable instructions further cause the physical processor to:
   generate a report indicating performance metrics based on the delegated security operation; and
   present the report to a user of the first computing device.

15. One or more non-transitory computer-readable media comprising computer-executable instructions that, when executed by at least one processor of a computing device, cause the computing device to:
   receive device state data from one or more computing devices;
   determine a device state reputation for each of the one or more computing devices based on the device state data;
   select a device from the one or more computing devices based on the device state reputation for each of the one or more computing devices;
   in response to selecting the device, delegate a security operation to the selected device; and
   receive a result of the delegated security operation from the selected device.

16. The one or more non-transitory computer-readable media of claim 15, wherein the device state data comprises at least one of:
   (i) an interactive state of a respective computing device,
   (ii) an indication that a network of the respective computing device is metered or non-metered,
   (iii) a battery level of the respective computing device,
   (iv) CPU utilization of the respective computing device,
   (v) memory utilization of the respective computing device, or
   (vi) types of applications executing on the respective computing device.

17. The one or more non-transitory computer-readable media of claim 15, wherein the security operation comprises at least one of:
   (i) scanning available wireless networks,
   (ii) obtaining security reputation data associated with one or more applications,
   (iii) obtaining security reputation data associated with one or more websites, or
   (iv) obtaining one or more security policies from a server.

18. The one or more non-transitory computer-readable media of claim 15, wherein the computer-executable instructions further cause the computing device to:
   determine that the selected device has become unavailable after delegating the security operation to the selected device;
   select a different device from the one or more computing devices based on the device state reputation for each of the one or more computing devices; and
   in response to selecting the different device, re-delegate security operation to the selected different device.

19. The one or more non-transitory computer-readable media of claim 15, wherein the computer-executable instructions further cause the computing device to:
   receive updated device state data for a different device of the one or more computing devices;
   determine a new device state reputation for the different device based on the updated device state data;
   compare the new device state reputation to the device state reputation for each of the one or more computing devices;
   select the different device based on the new device state reputation; and
   in response to selecting the device, delegate a different security operation to the different device.

20. The one or more non-transitory computer-readable media of claim 15, wherein the computer-executable instructions further cause the selected device to:
   receive one or more security operations from the one or more computing devices;
   request data for the one or more security operations from the one or more computing devices and data for the delegated security operation from the computing device; and
   transmit a respective subset of the requested data to the computing device and to the one or more computing devices.

\* \* \* \* \*

UNITED STATES PATENT AND TRADEMARK OFFICE
CERTIFICATE OF CORRECTION

PATENT NO. : 11,095,683 B1  
APPLICATION NO. : 16/233991  
DATED : August 17, 2021  
INVENTOR(S) : Anand Darak et al.

Page 1 of 1

It is certified that error appears in the above-identified patent and that said Letters Patent is hereby corrected as shown below:

In the Claims

In Column 18, Claim 1, Line 61, after "security" delete "operations" and insert -- operation --, therefor.

In Column 19, Claim 6, Line 61, after "for" delete "tone" and insert -- one --, therefor.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*